(12) United States Patent
Oya

(10) Patent No.: US 12,522,221 B2
(45) Date of Patent: Jan. 13, 2026

(54) DRIVING SUPPORT METHOD AND DRIVING SUPPORT DEVICE FOR VEHICLE

(71) Applicant: TOYOTA JIDOSHA KABUSHIKI KAISHA, Toyota (JP)

(72) Inventor: Kai Oya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 18/469,072

(22) Filed: Sep. 18, 2023

(65) Prior Publication Data
US 2024/0227818 A1    Jul. 11, 2024

(30) Foreign Application Priority Data
Jan. 5, 2023 (JP) .................. 2023-000688

(51) Int. Cl.
| | | |
|---|---|---|
| *B60W 40/09* | (2012.01) | |
| *B60W 30/09* | (2012.01) | |
| *B60W 40/02* | (2006.01) | |
| *G06V 20/56* | (2022.01) | |
| *G06V 20/59* | (2022.01) | |

(52) U.S. Cl.
CPC ............ *B60W 40/09* (2013.01); *B60W 30/09* (2013.01); *B60W 40/02* (2013.01); *G06V 20/56* (2022.01); *G06V 20/597* (2022.01)

(58) Field of Classification Search
CPC ...... B60W 40/09; B60W 30/09; B60W 40/02; G06V 20/597; G06V 20/56
See application file for complete search history.

(56) References Cited

U.S. PATENT DOCUMENTS

| | | | |
|---|---|---|---|
| 9,405,727 B2 | 8/2016 | Nagata | |
| 9,669,760 B2 | 6/2017 | Hanita et al. | |
| 9,898,929 B2 | 2/2018 | Harada et al. | |
| 11,175,673 B2 | 11/2021 | Eshima | |
| 2016/0041553 A1* | 2/2016 | Sato ................ | B60W 50/0098 701/23 |
| 2020/0207341 A1 | 7/2020 | Inoue et al. | |
| 2020/0369269 A1* | 11/2020 | Tanaka ............. | G08G 1/096725 |
| 2021/0039663 A1* | 2/2021 | Gohlke ................ | B60W 50/10 |
| 2021/0061350 A1 | 3/2021 | Kinoshita et al. | |
| 2021/0284141 A1 | 9/2021 | Sugaya | |
| 2021/0284237 A1 | 9/2021 | Miyano et al. | |
| 2021/0291820 A1 | 9/2021 | Inoue et al. | |
| 2022/0119004 A1* | 4/2022 | Avadhanam ........... | G06N 20/00 |

(Continued)

FOREIGN PATENT DOCUMENTS

| | | |
|---|---|---|
| JP | 2010-020365 A | 1/2010 |
| JP | 2022-054279 A | 4/2022 |
| WO | 2010/004712 A1 | 1/2010 |

*Primary Examiner* — Mohamad O El Sayah
(74) *Attorney, Agent, or Firm* — SoraIP, Inc.

(57) ABSTRACT

Information about the driving environment of the vehicle and information about factors influencing the driving behavior of the vehicle by the driver of the vehicle are obtained. A tendency of the driver's driving behavior is learned based on the information about the driving environment and the information about the factors. Based on the learned tendency of driving behavior, the driver's receptivity to the execution of driving support control of the vehicle is estimated. The driving support control is executed according to the estimated acceptability when the conditions for executing the driving support control are satisfied.

3 Claims, 3 Drawing Sheets

(56) References Cited

U.S. PATENT DOCUMENTS

| | | | | |
|---|---|---|---|---|
| 2022/0188866 A1* | 6/2022 | Farmer | .................. | G06Q 10/02 |
| 2022/0234603 A1* | 7/2022 | Mujumdar | ............ | B60W 40/09 |
| 2023/0202464 A1* | 6/2023 | Oguro | .................. | B60W 40/06 |
| | | | | 701/301 |
| 2023/0322261 A1* | 10/2023 | Otsuka | .................. | G08G 1/166 |
| | | | | 701/23 |
| 2024/0400057 A1* | 12/2024 | Fayad | ................. | B60W 30/143 |
| 2024/0416924 A1* | 12/2024 | Liu | .................... | B60W 30/146 |

\* cited by examiner

DRIVING SUPPORT METHOD AND DRIVING SUPPORT DEVICE FOR VEHICLE

CROSS-REFERENCE TO RELATED APPLICATION

This application claims priority to Japanese Patent Application No. 2023-000688 filed on Jan. 5, 2023, incorporated herein by reference in its entirety.

BACKGROUND

1. Technical Field

The present disclosure relates to a method and a device for supporting driving of a vehicle.

2. Description of Related Art

Japanese Unexamined Patent Application Publication No. 2022-054279 (JP 2022-054279 A) discloses a device that executes driving support control of a vehicle. This conventional device stores learning data on the relationship between the degree of risk felt by a driver of the vehicle for an obstacle around the vehicle (for example, the degree of fear estimated from the facial expression of the driver) and a factor for the risk (for example, the distance from the vehicle to the obstacle). Further, when an obstacle is detected around the vehicle, the conventional device sets a traveling trajectory for the driving support control that reduces risk factors for the obstacle, based on the learning data.

SUMMARY

Setting the traveling trajectory based on the learning data that is executed by the conventional device, may be effective for an obstacle for which the degree of risk felt by the driver is high. On the other hand, the driver may perceive that the setting of the traveling trajectory is unnecessary processing, with respect to an obstacle for which the degree thereof is low. Furthermore, when such a situation is repeated, there is a possibility that the driver inputs a setting to avoid the execution of the driving support control. Then, it becomes difficult to suppress the occurrence of an accident by avoiding a collision with the risk, that is, an obstacle.

Further, the setting of the traveling trajectory executed by the conventional device is executed when an apparent risk is detected. However, there are potential as well as apparent risks. Here, the driving support control based on an assumption of potential risks is executed assuming that an obstacle comes out of the driver's blind spot, for example. Therefore, the driver tends to perceive the execution of the driving support control based on the assumption of potential risks to be unnecessary processing compared to an execution of driving support control based on an assumption of apparent risks. Therefore, it is desirable to improve the driving support control base on the assumption of potential risks, in particular, to suppress the avoidance setting from being input by the driver.

One object of the present disclosure is to provide a technique that can suppress the driver from inputting a setting to avoid the execution of the driving support control.

A first aspect of the present disclosure is a method for supporting driving of a vehicle that includes the following characteristics. The method includes: a step of acquiring information on a driving environment of the vehicle and information on a factor influencing driving behavior of the vehicle by a driver of the vehicle; a step of learning a tendency of the driving behavior of the driver, based on the information on the driving environment and the information on the factor; a step of estimating acceptability of the driver for an execution of driving support control of the vehicle when the driving support control of the vehicle is executed, based on the learned tendency of the driving behavior; and a step of executing the driving support control, based on the estimated acceptability, when an execution condition of the driving support control is satisfied.

A second aspect of the present disclosure is a device for supporting driving of a vehicle that includes the following characteristics. The device includes a processor configured to execute various processes. The processor is configured to execute: a process of acquiring information on a driving environment of the vehicle and information on a factor influencing driving behavior of the vehicle by a driver of the vehicle; a process of learning a tendency of the driving behavior of the driver, based on the information on the driving environment and the information on the factor; a process of estimating acceptability of the driver for an execution of driving support control of the vehicle when the driving support control of the vehicle is executed, based on the learned tendency of the driving behavior; and a process of executing the driving support control, based on the estimated acceptability, when an execution condition of the driving support control is satisfied.

With the present disclosure, the tendency of the driving behavior of the driver is learned. Also, when the driving support control is executed, the acceptability of the driver for the execution of the driving support control is estimated based on the tendency. Then, when the execution condition for the driving support control is satisfied, the driving support control is executed based on the estimated acceptability. Such execution of the driving support control can suppress the driver from perceiving the execution as unnecessary processing. Therefore, it is possible to exhibit the effect of the execution of the driving support control, i.e., it is possible to suppress the occurrence of an accident.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
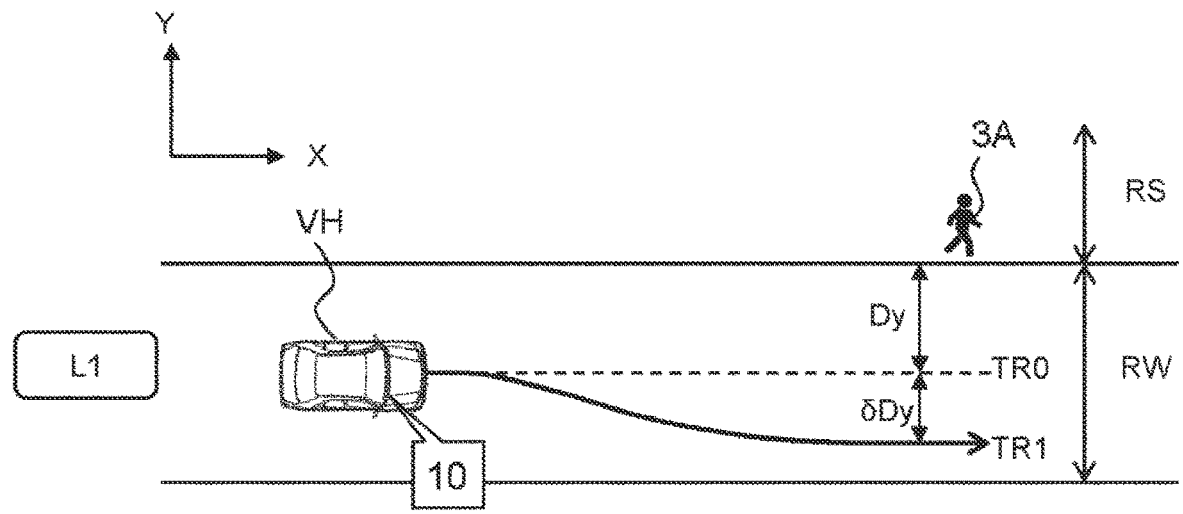
FIG. 1 is a diagram for explaining driving support control.

Hereinafter, embodiments of the present disclosure will be described with reference to the drawings. Note that the driving support method according to the embodiment is implemented by computer processing performed by the driving support device according to the embodiment. Moreover, in each figure, the same reference numerals are given to the same or corresponding parts, and the description thereof will be simplified or omitted.

1. Driving Assistance Control

Figure 2:
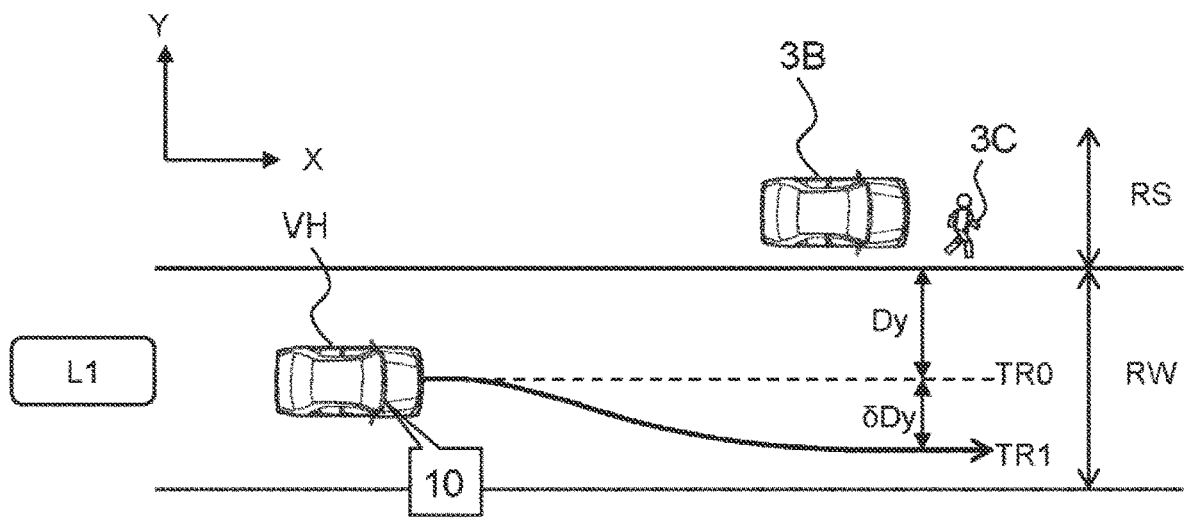
FIG. 2 is a diagram for explaining driving support control.

FIG. 1 and FIG. 2 are diagrams for explaining the premise of the embodiment. The driving support device 10 according to the embodiment executes "driving assistance control" that assists the driving of the vehicle VH. This driving support control may be included in control for autonomous driving of the vehicle VH (automatic driving control). Typically, the driving support device 10 is mounted on the vehicle VH. At least part of the driving support device 10 may be arranged in a device (for example, an external server) external to the vehicle VH to remotely perform driving assistance control. In other words, the driving support device 10 may be distributed to the vehicle VH and the external device.

Driving support control includes "risk avoidance control" for avoiding risk factor 3 ahead of vehicle VH. In the risk avoidance control, the driving support device 10 automatically performs at least one of steering and deceleration of the vehicle VH in order to avoid the risk factor 3 ahead of the vehicle VH. For example, in FIG. 1, vehicle VH is traveling on lane L1 in roadway RW. Road shoulder RS is adjacent to lane L1. A pedestrian 3A present on the road shoulder may be in front of the vehicle VH may enter the roadway RW. Therefore, it can be said that the pedestrian 3A is a risk factor 3.

In the example shown in FIG. 1, the risk avoidance control includes "steering support control" that automatically steers the vehicle VH to avoid the pedestrian 3A in advance. The risk avoidance control may include "deceleration support control" that automatically decelerates the vehicle VH so as to avoid the pedestrian 3A in advance. In the steering assistance control, the driving support device 10 steers the vehicle VH away from the pedestrian 3A. Pedestrian 3A may be replaced by a bicycle or a two-wheeled vehicle. In addition to the road shoulder RS, the risk factor 3 includes pedestrians, bicycles, and two-wheeled vehicles on the roadway RW.

FIG. 2 is a diagram for explaining another example of risk avoidance control. The risk factor 3 is not limited to the "manifested risk" like the pedestrian 3A shown in FIG. 1. The risk factor 3 may also include "latent risk". For example, in FIG. 2, a parked vehicle 3B exists on the road shoulder RS in front of the vehicle VH. The area ahead of the parked vehicle 3B is the blind spot of the vehicle VH, and the pedestrian 3C may jump out from the blind spot. Therefore, it can be said that the parked vehicle 3B and the pedestrian 3C are the risk factor 3 (latent risk).

In the example shown in FIG. 2, the risk avoidance control includes steering assistance control that automatically steers the vehicle VH to avoid the parked vehicle 3B in advance. In this steering assistance control, the driving support device 10 steers the vehicle VH away from the parked vehicle 3B. As in the example shown in FIG. 1, the risk avoidance control may include the deceleration support control.

Here, the vehicle coordinate system (X, Y) is defined. The vehicle coordinate system (X, Y) is a relative coordinate system fixed to the vehicle VH and changes as the vehicle VH moves. The X direction is the forward direction (traveling direction) of the vehicle VH. The Y direction is the lateral direction of the vehicle VH. The X direction and the Y direction are orthogonal to each other.

In FIGS. 1 and 2, a trajectory TR0 represents the running trajectory of the vehicle VH when the steering assist control is not executed. When the steering assist control is not executed, it is assumed that vehicle VH runs parallel to lane L1. Therefore, trajectory TR0 extends parallel to lane L1 from the current position of vehicle VH. In the following description, the lateral distance Dy is the shortest distance between trajectory TR0 and risk factor 3. In other words, the lateral distance Dy is the Y-direction distance between the vehicle VH (trajectory TR0) and the risk factor 3 when the vehicle VH passes by the risk factor 3 side.

In FIGS. 1 and 2, a first trajectory TR1 represents the travel trajectory of the vehicle VH when the steering assist control is executed. When steering assist control is executed, vehicle VH moves away from risk factor 3. The lateral movement amount δDy is the amount of movement of the vehicle VH in the direction away from the risk factor 3 caused by the steering support control. In other words, the lateral movement amount δDy is the amount of movement of the vehicle VH in the direction away from the risk factor 3 as seen from the trajectory TR0.

2. Features of the Embodiment

As already explained, there is a possibility that the driver inputs a setting that avoids execution of the driving support control. It is considered that the fact that such an avoidance setting is performed is the result of a decrease in the driver's acceptability (hereinafter also referred to as "support acceptability ACP") for the execution of the driving assistance control. In an extreme example of the avoidance setting, execution of the type of driving assistance control that the driver does not desire is always cancelled. In such a case, the effect of the driving support control whose execution has been canceled cannot be exhibited.

Therefore, in the embodiment, the degree of support acceptability ACP is estimated, and driving support control is executed accordingly. However, it is conceivable that there are individual differences in the degree of support acceptability ACP among drivers. Therefore, in the embodiment, the penchant (PEN) of the driver's driving behavior is learned. The support acceptability ACP is then estimated based on this driving behavior tendency PEN. According to the estimated support acceptability ACP, it is possible to prevent the driver from thinking that the execution of the driving assistance control is unnecessary processing. Therefore, it is possible to prevent the occurrence of an accident, which is the effect of the execution of driving support control.

Learning of the driving behavior tendency PEN is performed periodically. By periodically learning the driving behavior tendency PEN, it is expected that the accuracy of estimating the support acceptability ACP will increase. Learning of the driving behavior tendency PEN and execution of driving support control according to the estimated support acceptability ACP will be described below.

3. Driving Support Device

3-1. Overall Device Configuration Example

Figure 3:
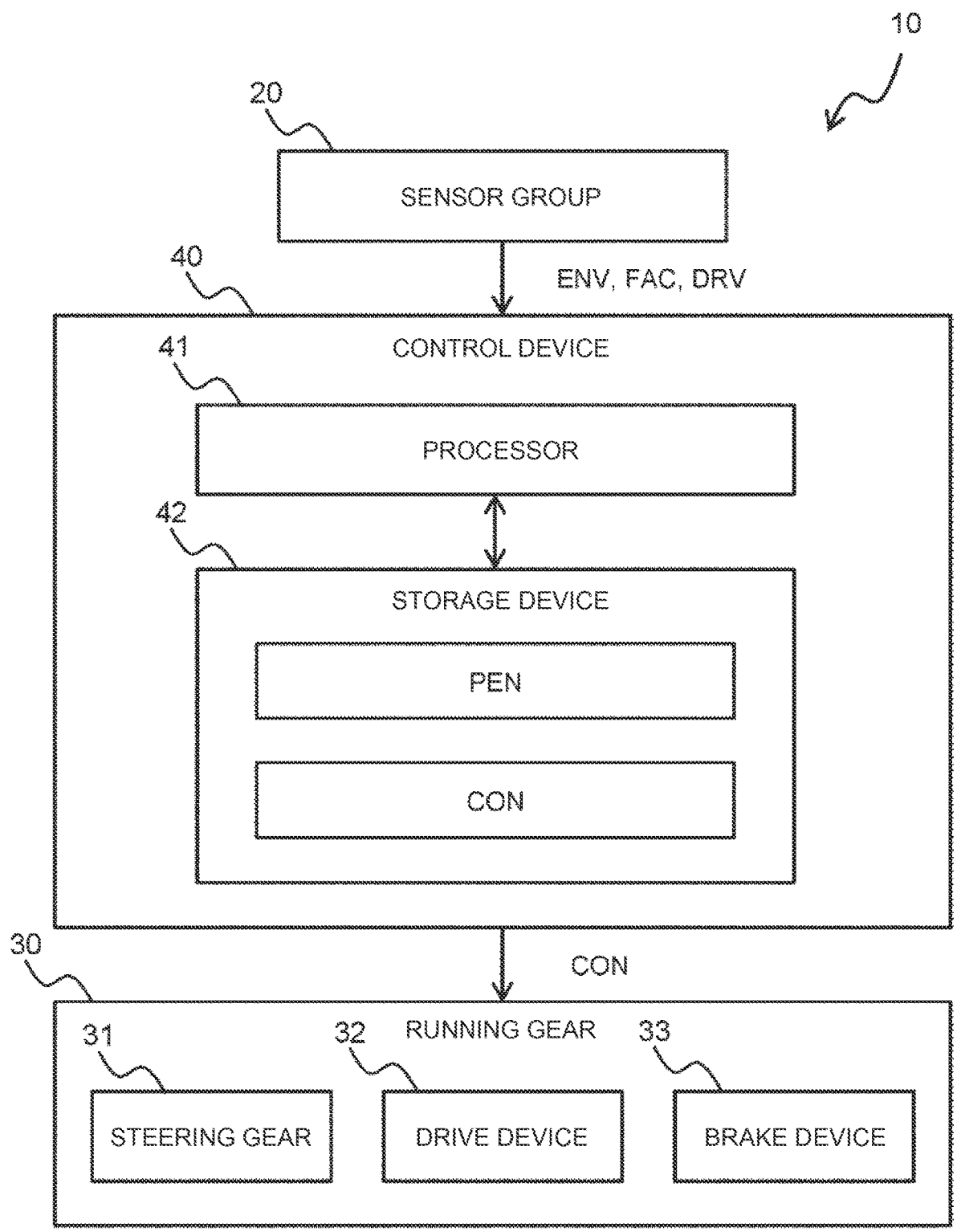
FIG. 3 is a block diagram showing a configuration example of the driving support device according to the embodiment.

FIG. 3 is a block diagram showing a configuration example of the driving support device 10 according to the embodiment. In the example shown in FIG. 3, the driving support device 10 includes a sensor group 20, a traveling device 30, and a control device 40.

The sensor group 20 includes, for example, position sensors, state sensors and recognition sensors. A position sensor detects the position and orientation of the vehicle VH. A Global Positioning System (GPS) sensor is exemplified as a position sensor. A state sensor detects the state of the vehicle VH. Examples of state sensors include a vehicle speed sensor and a steering angle sensor. A vehicle speed sensor detects the speed of the vehicle VH. The steering angle sensor detects the angle of the steering wheel. The recognition sensor recognizes the circumstances around the vehicle VH. Examples of recognition sensors include cameras, radars, Laser Imaging Detection and Ranging (LIDAR), and the like.

The position sensor, state sensor, and recognition sensor transmit detected or recognized information to the control device 40. The information transmitted from these sensors to the control device 40 constitutes the "information ENV regarding the driving environment" in the present disclosure. The driving environment information ENV also includes map information. The map information includes information such as lane layout information and road shape. The map information is stored, for example, in a predetermined storage device of the vehicle VH. The map information may be stored in a device outside the vehicle VH (for example, an external server).

Sensor group 20 also includes a vehicle cabin sensor that recognizes the driver of vehicle VH. An example of the vehicle cabin sensor is an interior camera that captures an image of the surroundings of the driver's seat. The indoor camera acquires an image including the face of the passenger sitting in the driver's seat (that is, the driver). The indoor camera transmits the acquired information to the control device 40. The information transmitted from these sensors to the control device 40 constitutes "driver recognition information DRV" in this disclosure.

The sensor group 20 further includes sensors, devices, devices, and the like that acquire information FAC regarding factors affecting the driver's driving behavior of the vehicle VH. Examples of factors that affect the driving behavior include the driver's purpose of driving the vehicle VH, the presence or absence of passengers (that is, fellow passengers) in the vehicle VH other than the driver, the driver's physical condition, and the driver's emotion.

The purpose of driving is estimated, for example, based on the route information of the vehicle VH. For example, consider the case where the combination of origin and destination of vehicle VH is familiar to the driver. In this case, it is presumed that the route of the vehicle VH is an ordinary route, and that the purpose of driving is ordinary purposes such as commuting to work, commuting to work, pick-up and drop-off, and the like. On the other hand, if the combination of the departure point and the destination is unfamiliar, it is presumed that the route of the vehicle VH is a temporary or emergency route, and that the purpose of driving is not the usual purpose. The route information is acquired from, for example, a navigation device of the vehicle VH, a device for managing the driver's schedule, or the like.

The presence or absence of occupants other than the driver is determined based on, for example, recognition information from an indoor camera that captures images of the surroundings of the seats other than the driver's seat of the vehicle VH, and detection information from a seating sensor provided in the seats other than the driver's seat.

The driver's physical condition includes good condition, bad condition and normal condition. The physical condition of the driver is estimated based on information detected by, for example, a vital sensor worn by the driver, an vehicle cabin sensor (infrared sensor) for detecting the body temperature of the driver of the vehicle VH, and the like.

The driver's emotions include negative emotions such as frustration, impatience, anger, and anxiety. Negative emotions are estimated based on information detected by the vital sensor, analysis information of images including the driver's face, information on the degree of time pressure, and the like. The degree of time pressure is estimated, for example, by combining information on the time zone in which the vehicle VH is driven and information on the route of the vehicle VH. For example, when the route of vehicle VH is a normal route, and the time at which the vehicle VH leaves the departure point is later than usual, it is estimated that the degree of time pressure is high.

The traveling device 30 includes a steering device, a driving device and a braking device. The steering device steers the wheels of the vehicle VH. For example, the steering system includes an Electric Power Steering (EPS) system. A driving device is a power source that generates a driving force. An engine, an electric motor, an in-wheel motor, etc. are illustrated as a drive device. A braking device generates a braking force.

The control device 40 controls vehicle VH. Typically, the control device 40 is a microcomputer mounted on the vehicle VH. The control device 40 is also called an Electronic Control Unit (ECU). The control device 40 may be an information processing device external to vehicle VH. In this case, control device 40 communicates with vehicle VH and remotely controls vehicle VH.

The control device 40 has a processor 41 and a storage device 42. The processor 41 executes various processes. The storage device 42 is a volatile memory, a non-volatile memory, or the like. Various information is stored in the storage device 42. The various information includes the driving behavior tendency PEN. The various information also includes control information CON to be transmitted to the traveling device 30. Various processes by the processor 41 are realized by the processor 41 executing a control program, which is a computer program. The control program is stored in the storage device 42 or recorded in a computer-readable recording medium.

Figure 4:
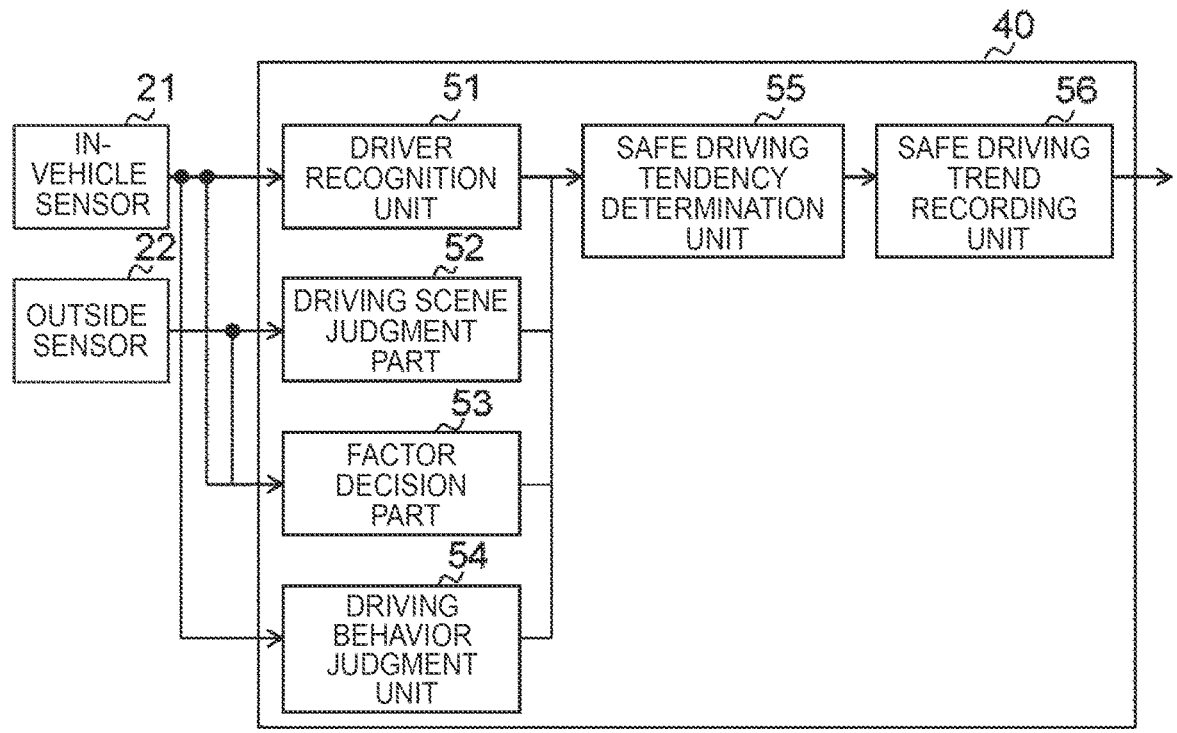
FIG. 4 is a diagram illustrating an example of the functional configuration of the control device shown in FIG. 3.

3-2. Functional Configuration Example of Control Device
3-2-1. Configuration Example for Learning Driving Behavior Tendency PEN FIG. 4 is a diagram illustrating a functional configuration example of the control device 40 regarding learning of the driving behavior tendency PEN. In the example shown in FIG. 4, the control device 40 includes a driver recognition unit 51, a driving scene determination unit 52, a factor estimation unit 53, a driving behavior determination unit 54, a driving tendency estimation unit 55, and a driving tendency storage unit 56. These functional units 51 to 56 are realized by reading a program stored in the storage device 42 and executing it by the processor 41 during manual operation of the vehicle VH by the driver.

The driver recognition unit 51 recognizes the driver of vehicle VH. Recognition of the driver is performed based on recognition information DRV from an internal sensor 21 included in the sensor group 20 (for example, an indoor camera that captures an image around the driver's seat). The driver recognition unit 51 gives identification information to the recognized driver. By providing the identification information, when a vehicle (for example, a shared vehicle) driven by a plurality of users is a vehicle VH, the driver recognized based on the recognition information DRV can be associated with the driving environment information ENV and the factor information FAC. This makes it possible to manage information on a user (driver) basis.

The driving scene determination unit 52 determines a scene in which the vehicle VH is being driven. Driving scene determination is performed based on driving environment information ENV (including map information) from external sensors 22 (e.g., position sensors and recognition sensors) included in the sensor group 20. Examples of driving scenes include scenes identified based on the relationship between the vehicle VH and static objects around the vehicle VH, such as a scene approaching an intersection that includes a stop line and a scene passing through an intersection without traffic lights. The driving scene may be a scene identified based on the relationship between the dynamic and static objects and the vehicle VH when there are dynamic objects around the vehicle VH in addition to the static objects.

The factor estimation unit 53 estimates factors that affect the driving behavior of vehicle VH by the driver. Factor estimation is performed based on factor information FAC from internal sensors 21 (for example, an indoor camera, a vital sensor, a navigation device, a schedule management device, a vehicle speed sensor, a steering angle sensor, etc.). Factor estimation may be performed by further combining factor information FAC from an external sensor 22 (e.g., recognition sensor). For example, a dynamic object existing in the destination of the vehicle VH can be considered as a factor affecting driving behavior. Therefore, the recognition information of this dynamic object can also be used as the factor information FAC. Factor estimation is performed in combination with the driving scene. Therefore, it is desirable that the factors are estimated based on the factor information FAC acquired during scene determination by the driving scene determination unit 52.

The driving behavior determination unit 54 determines the driving behavior of the vehicle VH by the driver. Determination of driving behavior is performed based on operation information from internal sensors 21 (e.g., steering angle sensor, accelerator position sensor, brake position sensor, etc.). The operation information from the internal sensor 21 is information on manual operation of the vehicle VH by the driver. Determination of the driving behavior is performed in combination with the driving scene. Therefore, it is desirable to determine the driving behavior based on the operation information acquired during the scene determination by the driving scene determination unit 52.

The driving tendency estimation unit 55 estimates the driving tendency of the driver recognized by the driver recognition unit 51. The driver's driving tendency is, for example, a behavioral tendency toward safe driving. For example, the behavior tendency for safe driving is estimated based on the driving scene determined by the driving scene determination unit 52, the factors acting on the driver's driving behavior in the driving scene estimated by the factor estimation unit 53, and the driver's driving behavior in the driving scene determined by the driving behavior determination unit 54. When a vehicle approaches an intersection that includes a stop line, it can be said that drivers who make a two-stage stop tend to behave toward safe driving. When a vehicle is traveling on a highway at a constant speed, it can be said that drivers who maintain a long inter-vehicle distance also tend to behave towards safe driving. The tendency of behavior toward safe driving is estimated by, for example, multiplying a variable indicating a basic tendency (for example, a three-stage variable of strong, weak, and moderate) by a coefficient ki set according to the estimation factor Fi.

The driving tendency storage unit 56 stores information on the driver's driving tendency estimated by the driving tendency estimation unit 55 (that is, the driving behavior tendency PEN). The learning of the driving behavior tendency PEN is performed by the processing by the driving tendency storage unit 56 being performed. Driving behavior tendency PEN is stored in a predetermined storage device of vehicle VH.

3-2-2. Configuration Example for Execution of Driving Support Control

Figure 5:
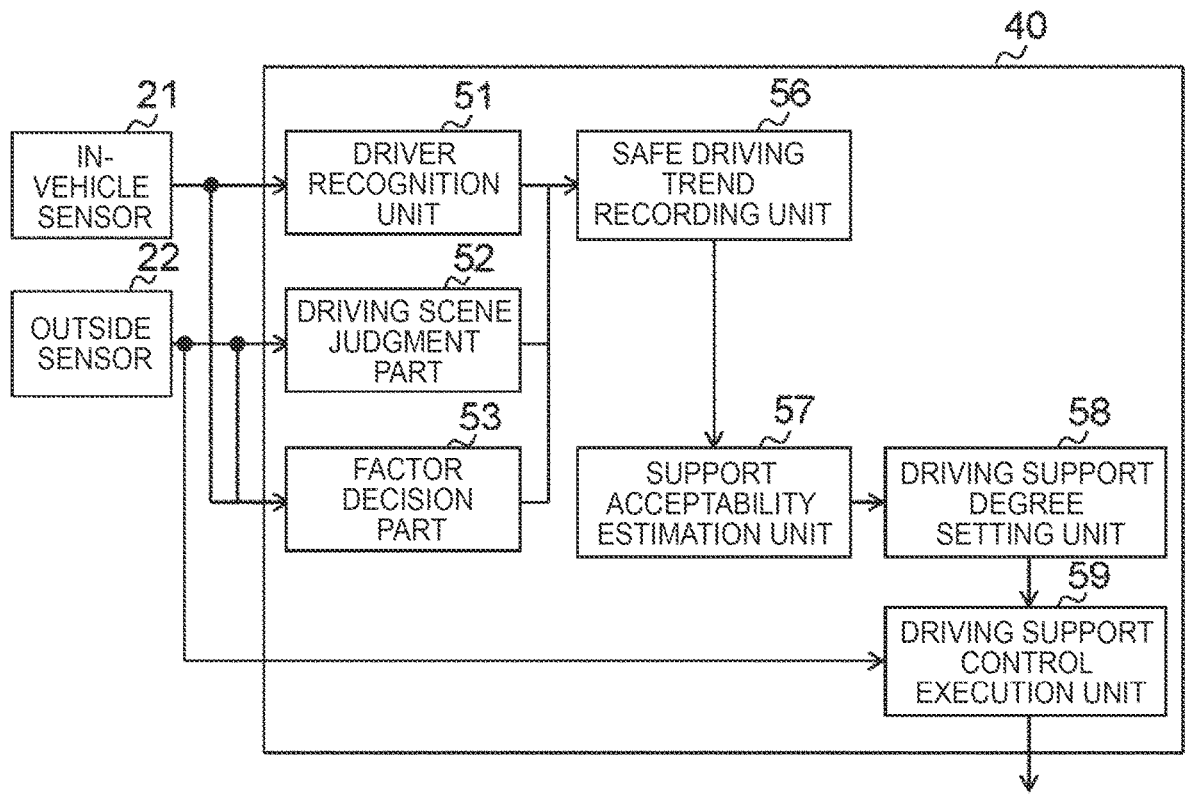
FIG. 5 is a diagram for explaining a functional configuration example of the control device shown in FIG. 3.

FIG. 5 is a diagram illustrating a functional configuration example of the control device 40 regarding execution of driving support control. The example shown in FIG. 5 includes, in addition to the functional units 51 to 53 and 56 described in FIG. 4, a support acceptability estimation unit 57, a driving support degree setting unit 58, and a driving support control execution unit 59. These functional units 51 to 53 and 56 to 59 are realized by reading a program stored in the storage device 42 and executing it by the processor 41 during manual operation of the vehicle VH by the driver or during automatic operation of the vehicle VH.

The driving tendency storage unit 56 uses the driver information recognized by the driver recognition unit 51 as a search key, and reads the driving behavior tendency PEN corresponding to this driver information from a predetermined storage device.

The driving scene determination unit 52 determines a scene in which the vehicle VH is being driven. Unlike the function described in FIG. 4, the driving scene determination unit 52 shown in FIG. 5 determines (predicts) the near future driving scene of the vehicle VH. However, the method for determining the driving scene in the near future is basically the same as the method (that is, the method for determining the current driving scene) by the driving scene determination unit 52 described with reference to FIG. 4.

The factor estimation unit 53 estimates factors that affect the driving behavior of vehicle VH by the driver. The method of factor estimation is basically the same as the method by the factor estimation unit 53 described with reference to FIG. 4.

The support acceptability estimation unit 57 estimates the support acceptability ACP of the passenger sitting in the driver's seat of vehicle VH. The support acceptability ACP is estimated based on the driving behavior tendency PEN read from the driving tendency storage unit 56, the near-future driving scene determined by the driving scene determination unit 52, and the factors acting on the driver's driving behavior in the driving scene estimated by the factor estimation unit 53. It should be noted that the factor (estimated factor Fi) estimated when learning the driving behavior tendency PEN do not necessarily match the factors that affect the driver's driving behavior of the vehicle VH in the near future. Therefore, when estimating the support acceptability ACP, it is desirable that the support acceptability ACP is finely adjusted according to the estimated factor Fi output from the factor estimation unit 53.

The support acceptability ACP is estimated in three stages, for example, high, low, and moderate. The level of the support acceptability ACP corresponds to the strength of the driving behavior tendency PEN. For example, when there is a strong tendency to behave toward safe driving, the support acceptability ACP is high. Conversely, if the propensity for safe driving behavior is low, the support acceptability ACP will be low. When the estimation factor Fi exists, the support acceptability ACP fluctuates.

The driving support degree setting unit 58 sets the driving assistance level. The driving assistance level is set in proportion to the support acceptability ACP estimated by the support acceptability estimation unit 57, for example. Specifically, when the support acceptability ACP is high, a high driving assistance degree is set, and when the support acceptability ACP is low, a low driving assistance degree is set. The degree of driving assistance may be expressed in stages like the degree of support acceptability ACP, or may be expressed numerically.

The driving support control execution unit 59 executes driving support control when a predetermined execution condition is satisfied. The predetermined operating conditions differ depending on the contents of the driving support control. When executing the driving support control, the driving support control execution unit 59 refers to the driving support level set by the driving support degree setting unit 58, and changes the amount of support by the driving support control. An example of the assistance amount to be changed is the lateral movement amount δDy in the steering assistance control (see FIGS. 1 and 2). In another example, the target deceleration in the deceleration support target is subject to change.

4. Effects

According to the embodiment described above, the driver's driving behavior tendency PEN is learned. Then, when the driving assistance control is executed, the support acceptability ACP is estimated based on the driving behavior tendency PEN, and the driving assistance degree is variably set based on the support acceptability ACP. By setting the degree of driving assistance variably, it is possible to prevent the execution of driving assistance control from being perceived as unnecessary processing by the driver. Therefore, it is possible to prevent the occurrence of an accident, which is the effect of the execution of driving support control.

What is claimed is:

1. A driving support method for a vehicle including a processor, an exterior sensor, an interior camera, a steering device, and a braking device, the driving support method comprising:
   acquiring first information on a driving environment of the vehicle, the first information being detected by the exterior sensor;
   acquiring second information on a factor influencing driving behavior of a driver of the vehicle, the second information being detected by the interior camera and indicating a physical condition and an emotion state of the driver;
   estimating a tendency of the driving behavior of the driver, based on the first information and the second information, the tendency of the driving behavior including information indicating a tendency of the driver to drive safely;
   estimating receptiveness of the driver to execution of a driving support control of the vehicle, based on the estimated tendency of the driving behavior;
   setting an execution condition of the driving support control, based on the first information and the second information;
   executing the driving support control via the steering device and the braking device, based on the estimated receptiveness, in a case where the execution condition of the driving support control is satisfied, the driving support control including a steering control and a braking control;
   estimating the receptiveness to be higher in a case where the estimated tendency of the behavior for safe driving is high than in a case where the estimated tendency of the behavior for safe driving is low; and
   adjusting a driving support degree of the driving support control based on the estimated receptiveness, the driving support degree including a lateral movement amount in the steering control and a deceleration amount of the braking control.

2. The driving support method according to claim 1, further comprising
   acquiring a facial image of the driver from the interior camera;
   recognizing the driver based on the acquired facial image; and
   estimating the receptiveness based on the first information and the second information associated with the recognized driver.

3. A driving support device for a vehicle including an exterior sensor, an interior camera, a steering device, and a braking device, the driving support device comprising
   a processor configured to communicate with the exterior sensor, the interior camera, the steering device, and the braking device, wherein the processor is configured to:
   acquire first information on a driving environment of the vehicle, the first information being detected by the exterior sensor;
   acquiring second information on a factor influencing driving behavior of a driver of the vehicle, the second information being detected by the interior camera and indicating a physical condition and an emotion state of the driver;
   estimate a tendency of the driving behavior of the driver, based on the first information and the second information, the tendency of the driving behavior including information indicating a tendency of the driver to drive safely;
   estimate receptiveness of the driver to execution of a driving support control of the vehicle, based on the estimated tendency of the driving behavior;
   set an execution condition of the driving support control, based on the first information and the second information;
   execute the driving support control via the steering device and the braking device, based on the estimated receptiveness, in a case where the execution condition of the driving support control is satisfied, the driving support control including a steering control and a braking control;
   estimate the receptiveness to be higher in a case where the estimated tendency of the behavior for safe driving is high than in a case where the estimated tendency of the behavior for safe driving is low; and
   adjust a driving support degree of the driving support control based on the estimated receptiveness, the driving support degree including a lateral movement amount in the steering control and a deceleration amount of the braking control.

* * * * *